(12) United States Patent
Heddy, III et al.

(10) Patent No.: US 10,359,078 B2
(45) Date of Patent: Jul. 23, 2019

(54) HEAT ISOLATING VTG LEVER AND LINKAGE

(71) Applicant: BorgWarner Inc., Auburn Hills, MI (US)

(72) Inventors: George Edward Heddy, III, Hendersonville, NC (US); Brian Edward Handlon, Horse Shoe, NC (US)

(73) Assignee: BorgWarner Inc., Auburn Hills, MI (US)

( * ) Notice: Subject to any disclaimer, the term of this patent is extended or adjusted under 35 U.S.C. 154(b) by 978 days.

(21) Appl. No.: 14/400,007

(22) PCT Filed: May 1, 2013

(86) PCT No.: PCT/US2013/038972
§ 371 (c)(1),
(2) Date: Nov. 10, 2014

(87) PCT Pub. No.: WO2013/173056
PCT Pub. Date: Nov. 21, 2013

(65) Prior Publication Data
US 2015/0122076 A1 May 7, 2015

Related U.S. Application Data

(60) Provisional application No. 61/648,144, filed on May 17, 2012.

(51) Int. Cl.
*F16D 1/06* (2006.01)
*F02B 37/24* (2006.01)
*F16C 7/02* (2006.01)

(52) U.S. Cl.
CPC ............... *F16D 1/06* (2013.01); *F02B 37/24* (2013.01); *F16C 7/023* (2013.01);
(Continued)

(58) Field of Classification Search
CPC .. F16D 1/06; F02B 37/24; F16C 7/023; F16C 2202/24; F16C 2360/24; F16C 7/02; B60G 7/001; B60G 7/005; Y10T 74/20582
See application file for complete search history.

(56) References Cited

U.S. PATENT DOCUMENTS 1,380,659 A * 6/1921 Hebron ..................... F16C 7/02
74/559
1,781,474 A * 11/1930 Pierson ..................... F16C 9/04
74/571.1
(Continued)

FOREIGN PATENT DOCUMENTS

CN 2773387 Y 4/2006
DE 2807298 A1 * 8/1979 ............. F16C 7/023
(Continued)

OTHER PUBLICATIONS

International Application No. PCT/US2013/038972, International Search Report & Written Opinion, 10 pages, dated Sep. 27, 2013.
(Continued)

*Primary Examiner* — Thomas C Diaz
(74) *Attorney, Agent, or Firm* — Perkins Coie LLP

(57) ABSTRACT

A heat isolating linkage (5) that includes an elongate link having first and second end portions (10, 12) and a middle portion (14) extending therebetween. A bearing opening (16) is formed in the first end portion (10) and a bearing race (18) is disposed in the bearing opening (16). A rod end ball (20) is disposed in the bearing race (18). At least one aperture (30-36) is formed through the middle portion (14). The middle portion (14) may include a plurality of apertures (30-36) each in the form of a rectangle that forms a ladder pattern. Accordingly, the middle portion (14) has a cross sectional area (A2) that is smaller than the cross sectional
(Continued)

area of at least one of the first and second end portions (A1, A3).

8 Claims, 5 Drawing Sheets

(52) U.S. Cl.
CPC ...... *F16C 2202/24* (2013.01); *F16C 2360/24* (2013.01); *F16D 2300/02* (2013.01); *Y02T 10/144* (2013.01); *Y10T 74/20582* (2015.01)

(56) References Cited

U.S. PATENT DOCUMENTS

| | | | |
|---|---|---|---|
| 2,083,609 A | | 6/1937 | Lefevre |
| 2,243,286 A | | 5/1941 | Probst |
| 3,011,360 A | * | 12/1961 | Kreissig ................. F01L 1/181 74/519 |
| 3,438,661 A | | 4/1969 | Bowen, III |
| 4,465,392 A | | 8/1984 | Lang |
| 5,129,148 A | | 7/1992 | Adams et al. |
| 5,524,987 A | * | 6/1996 | Vigeh ....................... F16C 7/02 384/209 |
| 5,759,309 A | | 6/1998 | Watts et al. |
| 5,782,078 A | | 7/1998 | Brantley |
| 6,019,383 A | | 2/2000 | Kociba et al. |
| 6,079,210 A | | 6/2000 | Pintauro et al. |
| 6,113,058 A | | 9/2000 | Iwasaki |
| 7,878,448 B2 | | 2/2011 | Olsen et al. |
| 8,322,738 B2 | | 12/2012 | Haas et al. |
| 2002/0050138 A1 | | 5/2002 | Deacon |
| 2004/0055297 A1 | | 3/2004 | Allmang et al. |
| 2006/0108763 A1 | * | 5/2006 | Ray .......................... B60G 3/20 280/124.136 |
| 2006/0273221 A1 | | 12/2006 | Olsen et al. |
| 2008/0078353 A1 | | 4/2008 | Hayama |
| 2009/0092481 A1 | | 4/2009 | Genin et al. |
| 2010/0021094 A1 | * | 1/2010 | Kaufman ............ F16C 11/0614 384/209 |
| 2010/0269629 A1 | | 10/2010 | Nunn et al. |
| 2011/0185725 A1 | | 8/2011 | Dettmann et al. |

FOREIGN PATENT DOCUMENTS

| | | | | |
|---|---|---|---|---|
| DE | | 4232432 A1 | * 3/1994 | ............. B21K 1/766 |
| DE | | 102008049257 A1 | * 4/2010 | ................ F16C 7/02 |
| DE | | 102010004559 A1 | 7/2011 | |
| EP | | 1400658 A1 | 3/2004 | |
| JP | | S63-074514 | 5/1988 | |
| WO | WO | 2006/108028 A2 | 10/2006 | |
| WO | WO | 2007/044012 A1 | 4/2007 | |
| WO | | 2011012625 | 2/2011 | |
| WO | | 2011012625 A1 | 2/2011 | |
| WO | | 2011087939 A2 | 7/2011 | |
| WO | WO | 2011/087939 A2 | 7/2011 | |

OTHER PUBLICATIONS

International Application No. PCT/US2013/038978, International Seach Report & Written Opinion, 11 pages, dated Sep. 27, 2013.
Chinese Patent Application No. 201380023843.7, Second Office Action, 14 pages, dated Nov. 18, 2016.
Chinese Patent Application No. 201380023843.7, Third Office Action, 8 pages, dated Jun. 8, 2017.
Chinese Patent Application No. 201380023843.7, Office Action, 16 pages, dated Mar. 28, 2016.
Chinese Patent Application No. 201380024001.3, Office Action, 13 pages, dated Mar. 17, 2016.
Korean Intellectual Property Office Opinion for Korean Application No. 10-2014-7033960; dated Dec. 24, 2018; 13 pages.

* cited by examiner (PRIOR ART)    FIG. 9
(PRIOR ART)

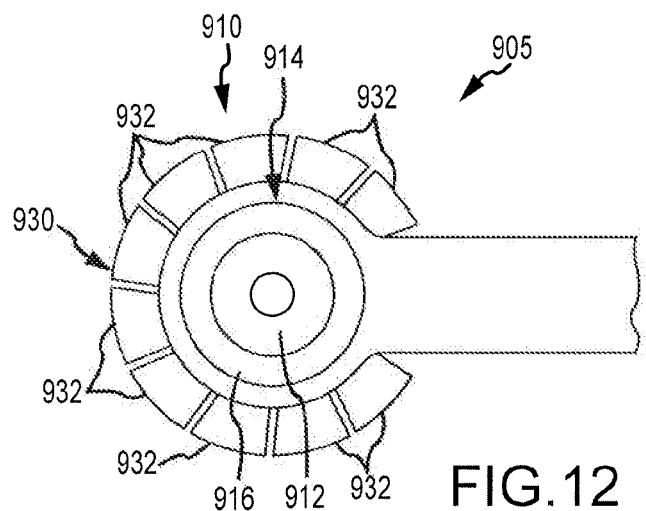
FIG.12
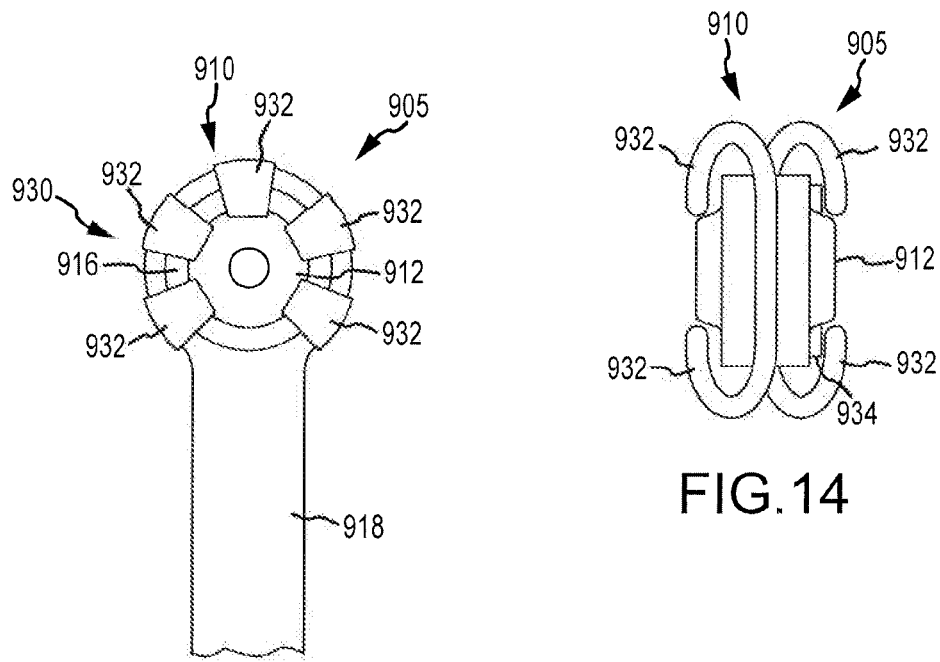
FIG.13
FIG.14

US 10,359,078 B2

HEAT ISOLATING VTG LEVER AND LINKAGE

BACKGROUND

Today's internal combustion engines must meet ever-stricter emissions and efficiency standards demanded by consumers and government regulatory agencies. Accordingly, automotive manufacturers and suppliers expend great effort and capital in researching and developing technology to improve the operation of the internal combustion engine. Turbochargers are one area of engine development that is of particular interest.

A turbocharger uses exhaust gas energy, which would normally be wasted, to drive a turbine. The turbine is mounted to a shaft that in turn drives a compressor. The turbine converts the heat and kinetic energy of the exhaust into rotational power that drives the compressor. The objective of a turbocharger is to improve the engine's volumetric efficiency by increasing the density of the air entering the engine. The compressor draws in ambient air and compresses it into the intake manifold and ultimately the cylinders. Thus, a greater mass of air enters the cylinders on each intake stroke.

Given that a turbocharger must handle exhaust straight from the engine, it can be appreciated that the components of a turbocharger are subjected to extreme temperatures. Many turbocharger components have been designed to handle extreme heat, particularly on the turbine side of the turbocharger. However, some components are difficult to make temperature resistant while maintaining functionality, such as the moving joints and actuators associated with variable turbine geometry (VTG) mechanisms and waste gate control mechanisms. Accordingly, these components must be at least partially protected from the heat generated by the exhaust gas.

SUMMARY

Provided herein is a heat isolating linkage that includes an elongate link having first and second end portions and a middle portion extending therebetween. A bearing opening is formed in the first end portion and a bearing race is disposed in the bearing opening. A rod end ball is disposed in the bearing race. At least one aperture is formed through the middle portion. In one embodiment, the middle portion includes a plurality of apertures each in the form of a rectangle that forms a ladder pattern. In another embodiment, the middle portion includes a plurality of apertures each in the form of a triangle that forms a truss pattern.

In certain aspects of the technology described herein, the middle portion has a cross sectional area that is smaller than the cross sectional area of at least one of the first and second end portions. The middle portion may have a cross sectional area that is smaller than the cross sectional area of both the first and second end portions.

In another embodiment, an insulation segment is disposed between the first and second end members. The insulation segment may comprise a plastic material or a composite material, for example. In another aspect of the technology, the insulation segment is clamped between the first and second end members.

In yet another embodiment, the middle portion includes at least one, if not a plurality of cooling fins extending from the middle portion. In one case, the cooling fins extend longitudinally along the middle portion. In another case, the cooling fins extend orthogonal to the longitudinal axis.

These and other aspects of the heat isolating linkages will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

DRAWINGS

Non-limiting and non-exhaustive embodiments of the heat isolating linkage, including the preferred embodiment, are described with reference to the following figures, wherein like reference numerals refer to like parts throughout the various views unless otherwise specified.

FIG. 9 is a side view in elevation of the conventional rod end shown in FIG. 8;

FIG. 12 is a top plan view of a rod end heat isolating actuator linkage according to a second exemplary embodiment;

FIG. 13 is a front view in elevation of the rod end heat isolating actuator linkage shown in FIG. 12; and FIG. 14 is a partial cross-sectional view of the rod end housing shown in FIG. 13.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
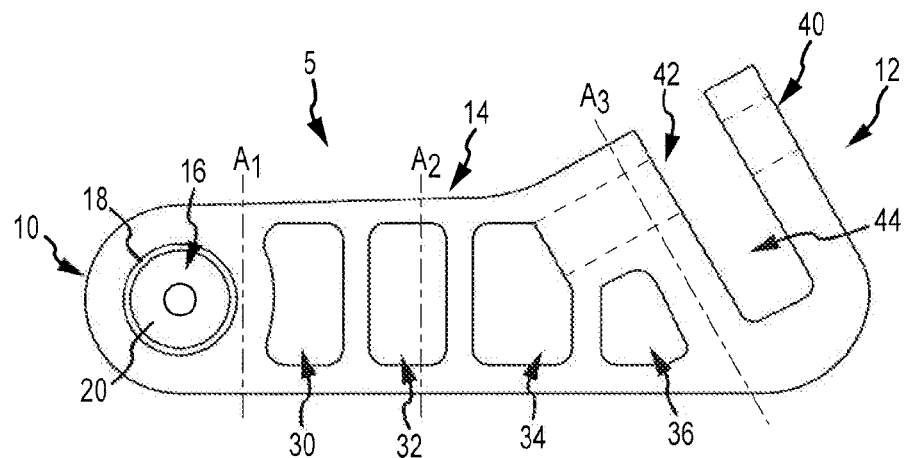
FIG. 1 is a top plan view of a heat isolating linkage according to a first exemplary embodiment.

The heat isolating linkage 5 shown in FIG. 1 is for use with a VTG turbocharger. In this embodiment, the heat isolating linkage 5 includes a first end portion 10 and a second end portion 12 with a middle portion 14 extending therebetween. The first end portion 10 includes a bearing opening 16 sized and configured to receive a bearing race 18 and a rod end ball 20. The second end portion 12 is, in this case, in the form of an actuator shaft clamp 44 which includes a clearance hole 40 and a threaded aperture 42, both of which are configured to receive a fastener therein. The middle portion 14 of heat isolating linkage 5 includes a plurality of apertures 30-36. In this case, apertures 30-36 are rectangular in form and, also in this case, create a ladder pattern. It should be appreciated that while each of the apertures may be truncated with respect to neighboring features of the linkage, in general, the apertures are rectangular in form, such as aperture 32. For example, aperture 30 is contoured to match the bearing opening 16. As another example, aperture 36 is truncated such that it does not intersect the threaded aperture 42 or clamp region 44.

Apertures 30-36 have the effect of reducing the cross-sectional area of the mid-portion 14. For example, aperture 32 reduces the area A2 of the mid-portion such that it is less than the area of the first end portion cross-section or the second end portion cross-section A1 and A3, respectively. Therefore, heat transfer from the VTG mechanism is inhibited such that it protects the bearing race 18 from excessive heat.

Figure 2:
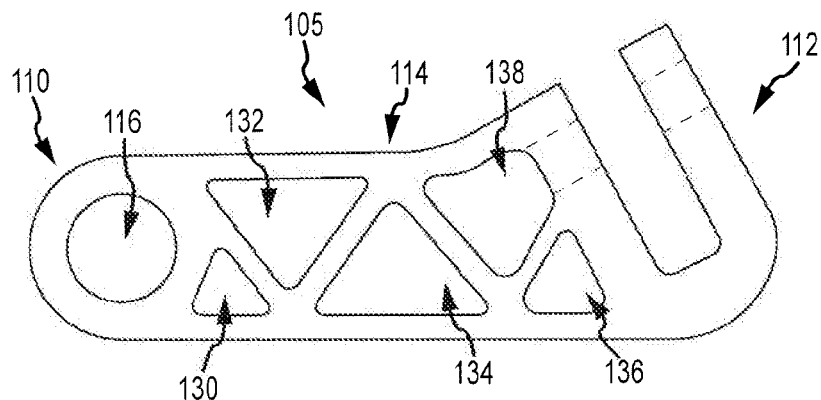
FIG. 2 is a top plan view of a heat isolating linkage according to a second exemplary embodiment.

A heat isolating linkage 105 according to a second exemplary embodiment is represented in FIG. 2. In this case, the linkage includes an elongate link having a first end portion 110 and a second end portion 112 with middle portion 114 extending therebetween. First end portion 110 includes bearing opening 116 and a plurality of apertures 130-138. As can be appreciated, the linkage 105 is similar to that described above with respect to FIG. 1; however, in this case, the apertures 130-138 are each in the form of a triangle which, in turn, creates a truss pattern. While the above described embodiments illustrate apertures with particular shapes, it should be understood that the shape of the cutouts should not be limited to rectangular or triangular, but can be any shape that reduces longitudinal cross-sectional area.

Figure 3:
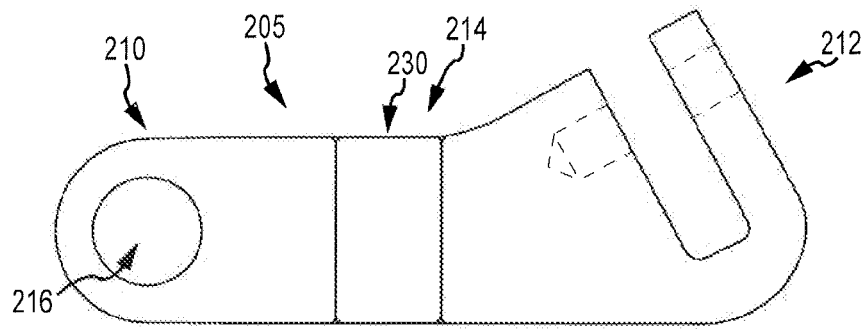
FIG. 3 is a top plan view of a heat isolating linkage according to a third exemplary embodiment.

A heat isolating linkage 205 according to a third exemplary embodiment is shown in FIG. 3. Again, this linkage 205 has similar features to those described above with respect to FIGS. 1 and 2 in that linkage 205 includes an elongate link having a first end portion 210, a second end portion 212, and a middle portion 214 extending therebetween. In this case, however, the middle portion includes an insulation segment 230. Insulation segment 230 may be comprised of plastic or a composite plastic material having good heat isolation characteristics.

Figure 4:
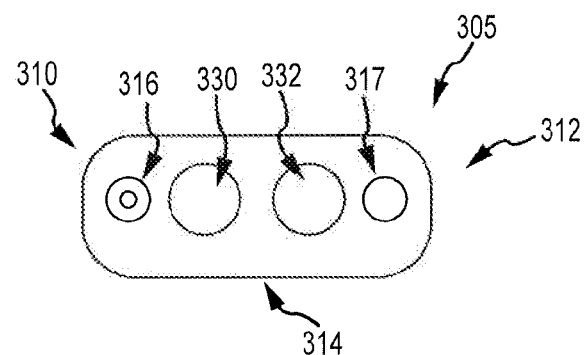
FIG. 4 is a top plan view of a heat isolating linkage according to a fourth exemplary embodiment.
Figure 5:
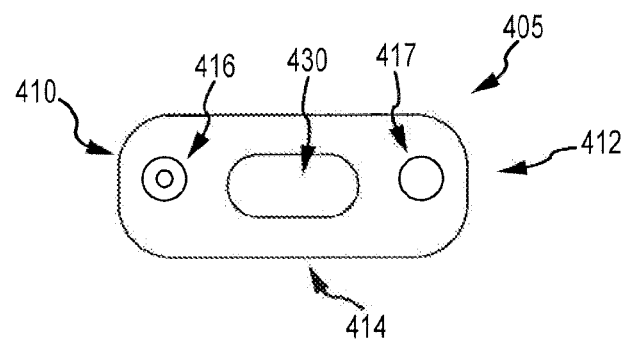
FIG. 5 is a top plan view of a heat isolating linkage according to a fifth exemplary embodiment.

FIGS. 4-7 illustrate heat isolating linkages intended for use with waste gate actuators. For example, FIG. 4 is an elongate heat isolating linkage according to a fourth exemplary embodiment including a first end portion 310 and a second end portion 312 with a middle portion 314 extending therebetween. First end portion 310 includes a bearing opening 316 and second end portion 312 may include an aperture 317 to facilitate welding the lever to a waste gate shaft. Middle portion 314 includes apertures 330 and 332, which reduce the cross-sectional area of linkage 305, thereby reducing its heat conductivity. In this case, the apertures are in the form of circles; however, other aperture shapes may be used. For example, with reference to FIG. 5, heat isolating linkage 405 according to a fifth exemplary embodiment includes an elongate or obround aperture 430 formed through the mid-portion 414. Again, the linkage 405 includes first and second end portions 410 and 412, respectively, with middle portion 414 extending therebetween. First end portion 410 includes a bearing opening 416 and second end portion 412 may include an aperture 417.

Figure 6:
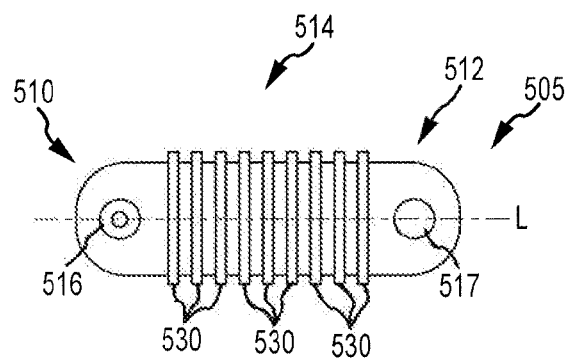
FIG. 6 is a top plan view of a heat isolating linkage according to a sixth exemplary embodiment.
Figure 7:
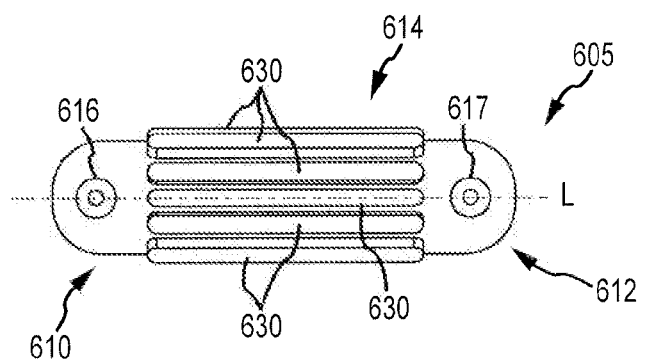
FIG. 7 is a top plan view of a heat isolating linkage according to a seventh exemplary embodiment.

Waste gate heat isolation linkage 505 according to a sixth exemplary embodiment is shown in FIG. 6. Linkage 505 includes first and second end portions 510 and 512, respectively, with a middle portion 514 extending therebetween. First end portion 510 includes a bearing opening 516 and second end portion 512 may include an aperture 517. In this case, middle portion 514 includes a plurality of cooling elements, such as cooling fins 530. Linkage 505 extends along a longitudinal axis L. As can be seen in the figure, the cooling fins 530 extend transversely, or orthogonally, to the longitudinal axis L. FIG. 7 illustrates linkage 605 according to a seventh exemplary embodiment, which also includes cooling fins. Linkage 605 includes first and second end portions 610 and 612, respectively, with middle portion 614 extending therebetween. First end portion 610 includes a bearing opening 616 and second end portion 612 may include an aperture 617. Middle portion 614 includes a plurality of longitudinally extending cooling fins 630. As can be appreciated with reference to the figure, cooling fins 630 extend longitudinally along the longitudinal axis L of linkage 605. Although the cooling elements above are illustrated as fins having particular orientations, it should be appreciated that the cooling elements may have different forms and orientations, such as for example, rods that could be spiral as well as longitudinal, or orthogonal, or other suitable geometry.

Figure 8:
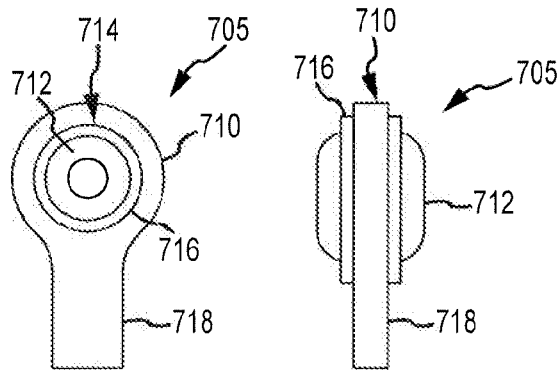
FIG. 8 is a front view in elevation of a conventional rod end.

Also disclosed herein is a heat isolating actuator linkage in the form of a rod end. As shown in FIGS. 8 and 9, a conventional rod end 705 includes a rod end housing 710 with a bearing opening 714 formed therethrough. Inserted into the bearing opening 714 is a race insert 716. Race insert 716 may be comprised of a bearing material such as bronze or plastic, for example. A rod end ball 712 is disposed in the race insert. Accordingly, the race insert acts to prevent metal-to-metal contact between the rod end ball and the rod end housing 710. The bearing housing also includes a threaded portion 718 extending from the rod end housing. In this case, the threaded portion includes female threads. However, as is known in the art, the rod end threaded portion may include male threads. It should be appreciated that with a conventional rod end bearing, the race insert and rod end ball are exposed to heat in the surrounding environment on both sides of the rod end.

Figure 10:
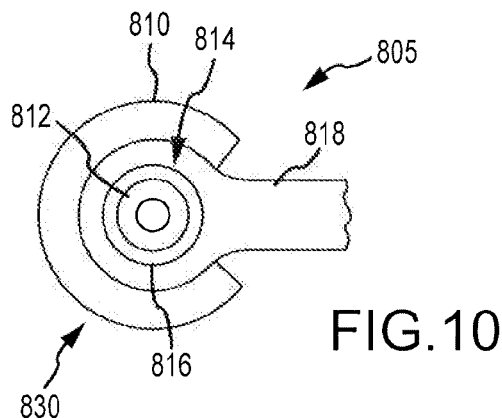
FIG. 10 is a top plan view of a rod end heat isolating actuator linkage according to a first exemplary embodiment.
Figure 11:
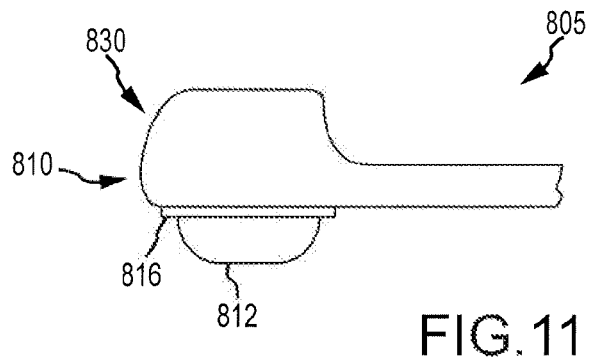
FIG. 11 is a side view in elevation of the rod end heat isolating actuator linkage shown in FIG. 10.

FIG. 10 illustrates a heat isolating actuator linkage in the form of a rod end according to a first exemplary embodiment. In this embodiment, rod end 805 includes a housing 810 with a rod end ball 812 and race insert 816 disposed therein. In FIG. 10, it can be seen that housing 810 also includes a shield flange 830 in a pre-formed or pre-stamped state. With further reference to FIG. 11, which shows the shield 830 in its final form after stamping, it can be appreciated that the shield 830 extends to one side of the rod end housing 810. Accordingly, the shielded side of the rod end 805 is placed adjacent the heat source such as the turbine housing of a turbocharger. Accordingly, the heat shield 830 prevents the transfer of heat to the race insert which may be damaged by excessive heat emanating from the turbine housing.

FIG. 12 illustrates a rod end heat isolating actuator linkage according to a second exemplary embodiment. In this case, rod end 905 includes a rod end housing 910 with a race insert 916 and a rod end ball 912 assembled therein. In this case, shield 930 comprises a plurality of circumferentially spaced flange segments 932. As shown in FIG. 12, the flange segments are formed onto the rod end housing 910 and are thereafter stamped or otherwise deformed into position. With reference to FIGS. 13 and 14, it can be appreciated that every other flange segment 932 is bent to one side or the other of the rod end housing 910, thereby creating a cage-like structure on both sides of the race insert. As shown in FIG. 14, a cover 934 may be inserted between the flange segments 932 and the rod end housing 910. Cover 934 may be placed adjacent rod end housing 910 prior to bending flange segments 932 into position, thereby capturing cover 934 in place. Cover 934 may be in the form of a disc or cup shaped shield element, for example.

Accordingly, the heat isolating linkages have been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A heat isolating turbocharger VTG lever, comprising:
   a one-piece elongate member having first and second end portions and a middle portion extending therebetween;
   a rod end ball located at the first end portion;
   a bearing race secured in the first end portion and disposed around the rod end ball;
   a VTG actuation shaft clamp formed in the second end portion; and
   at least one aperture formed through the middle portion, whereby the middle portion has a cross sectional area that is smaller than the cross sectional area of at least one of the first and second end portions, whereby heat transfer along the elongate member is inhibited such that it protects the bearing race from excessive heat when the second end portion is exposed to heat.

2. The heat isolating turbocharger VTG lever according to claim 1, including a plurality of apertures formed through the middle portion.

3. The heat isolating turbocharger VTG lever according to claim 2, wherein at least one of the plurality of apertures is in the form of a rectangle.

4. The heat isolating turbocharger VTG lever according to claim 3, wherein the plurality of apertures forms a ladder pattern.

5. The heat isolating turbocharger VTG lever according to claim 2, wherein at least one of the plurality of apertures is in the form of a triangle.

6. The heat isolating turbocharger VTG lever according to claim 5, wherein the plurality of apertures forms a truss pattern.

7. The heat isolating turbocharger VTG lever according to claim 1, wherein the bearing race comprises plastic.

8. The heat isolating turbocharger VTG lever according to claim 1, wherein the VTG actuation shaft clamp includes a threaded aperture extending at an angle with respect to a length of the elongate link.

* * * * *